United States Patent
Anandan et al.

[11] Patent Number: 5,811,925
[45] Date of Patent: Sep. 22, 1998

[54] INTEGRALLY MOLDED FLAT COMPACT FLUORESCENT LAMP

[75] Inventors: Munisamy Anandan, Burlington; Jakob Maya, Brookline, both of Mass.

[73] Assignee: Matsushita Electric Works Research and Development Laboratory, Inc., Woburn, Mass.

[21] Appl. No.: 759,382

[22] Filed: Dec. 4, 1996

[51] Int. Cl.[6] ............................... H01J 1/62; H01J 63/04
[52] U.S. Cl. ............................................................ 313/493
[58] Field of Search .................................. 313/493, 634, 313/635, 485; 445/23, 26

[56] References Cited

U.S. PATENT DOCUMENTS

| | | | |
|---|---|---|---|
| 2,405,518 | 8/1946 | Polevitzky et al. | 176/122 |
| 2,501,376 | 3/1950 | Breadner et al. | 176/122 |
| 2,555,749 | 6/1951 | Krefft | 313/109 |
| 3,226,590 | 12/1965 | Christy | 313/109 |
| 3,258,630 | 6/1966 | Scott | 313/109 |
| 3,646,383 | 2/1972 | Jones et al. | 313/109 |
| 5,220,249 | 6/1993 | Tsukada | 315/246 |

OTHER PUBLICATIONS

Hicks et al.—13th DASC.AIAA/IEEE Digital Avionics System Conference, pp. 630–635, Oct. 30–Nov. 3, 1994.

*Primary Examiner*—William L. Oen

[57] ABSTRACT

An integrally molded flat fluorescent lamp comprising a convoluted channel member (11) formed of vitreous glass with convoluted channel (14) fabricated by employing a combination of vacuum-assisted sag molding, press molding and blow molding techniques. While the part (11) is molten, a planar member (13) is fused to it by pressing the parts (11 and 13 at 15) together to form a closed glass envelope. The inside of the envelope is coated with a phosphor layer and preferably the external surface of the envelope is coated with a reflective layer. A pair of electron-emissive electrodes are fused to openings (12) in the envelope. They are sealed through glass flares at the two holes integral to the envelope. The envelope is evacuated and filled with a rare gas and mercury to a suitable pressure and sealed off to form a lamp.

14 Claims, 4 Drawing Sheets

INTEGRALLY MOLDED FLAT COMPACT FLUORESCENT LAMP

BACKGROUND OF THE INVENTION

The present invention relates to fluorescent lamps and particularly to flat compact fluorescent lamps which utilize a spiral and/or serpentine discharge path. Modern compact fluorescent lamps employ bending of circular glass tubes into the basic U-shape and multiples of U-shapes to arrive at the compactness to maintain the required arc length to achieve reasonable efficiency. An alternative method of deriving compactness is by the use of flat fluorescent lamps. Flat fluorescent lamps are area lamps (two dimensional) that can be designed to yield light output in preferred directions by employing internal reflectors. In the literature there are various geometries of flat fluorescent lamps containing different shapes of arcs such as "spiral", "serpentine" and combinations of these. All the flat fluorescent lamps basically employ two glass members, or one ceramic member and another glass member. These members are conventionally coated with a phosphor layer, a reflective layer and a protective layer prior to sealing the two discrete members. In several of the embodiments, either one member is formed, molded or machined and the other member is planar. In some lamps both members are formed, molded or machined.

SUMMARY OF THE PRIOR ART

Flat compact fluorescent lamps of the prior art had two discrete members which were individually subjected to coating and processing. A sealing operation utilizing a frit was necessary to integrate the two members into one. The present invention does not require frit sealing of the two members. Instead, the members are molded as integral units, fused together while molten, and the coatings are then applied and processed. The lamp includes a vitreous glass convoluted channeled member and a vitreous glass planar member. The glass forming the walls of the channelled member is fused with the glass of the periphery of said planar member. With such fusion, the two members form a lamp with a closed internal convoluted channel disposed therein. An electron-emissive electrode is centrally located in the lamp which further includes at least one peripheral electrode. Both of the electrodes are flame sealed to the channel member. A coating of a conventional light emissive phosphor is disposed on the inside of said channel walls and a conventional light reflective layer is disposed on the external surfaces of said channel member. In an alternative embodiment, the light reflective layer can be deposited on the inside of the channel to cover the planar member so light is emitted through the front side only of the lamp. The lamp of the present invention has a low weight compared to prior art lamps and does not employ laborious frit sealing operation which slows manufacturing rate and increases production costs.

In the prior art, a spiral channel flat compact fluorescent lamp has a molded glass or ceramic member containing the reflective and phosphor coated spiral channel and two protrusions enclosing two holes. Two electron-emissive electrodes mounted on wafers or flares, one of which contains an exhaust tubulation, and both integral with leads, are sealed to the protrusions through frit rings. The molded member is sealed at the top to a circular plate through a frit ring. Before this sealing is done, all the coatings, namely protective, reflective, and phosphor, are all disposed both on the circular plate and the molded member. The disadvantage in this prior art is the laborious step of frit application and sealing, in addition to the circular plate preparation. In mass manufacturing these extra operations increase the cost. Further, the weight of the molded glass, if press molded, is high. For a 5¼" diameter molded member with four spiral channels, the press-molded lamp weighed about 200 grams. The same member with sag molding technique weighed about 115 grams. The total weight of the lamp, which includes the weight of the circular plate, frit and the electrode assembly is 250 grams for press-molded lamps and about 165 grams for sag-molded lamps.

For commercial marketing, these weights are not attractive when compared to the weight of the existing compact fluorescent lamps of less than 100 grams.

Polevitzky described a spiral channel flat fluorescent lamp in 1946 (U.S. Pat. 2,405,518) which consisted of a metal housing with a spiral channel and a transparent cover plate sealed to the metal housing. The two members were independently coated, processed and had to be sealed. Breadner et al. described a circular flat fluorescent lamp in 1950 (U.S. Pat. 2,501,376) comprising two discrete glass members that generated a spiral channel extending from the periphery to the center and returning to the periphery. The two members were sealed after independent coating and processing. Krefft disclosed a flat fluorescent lamp in 1951 (U.S. Pat. 2,555,749) having two molded members that were independently processed prior to a separate sealing operation. Christy, in 1965, described a "panel lamp" (U.S. Pat. 3,226,590) having two complementary vacuum-molded glass members that were coated and processed. A fusion seal operation resulted in a single unit of the lamp. Jones et al. disclosed a fluorescent panel lamp in 1972 (U.S. Pat. 3,646,383) which measured 12" square with serpentine channels. It consisted of two molded members with eight grooved sections. These sections were coated, processed with phosphor and other coatings, and then sealed together to form a single unit by heating the edges above the strain point and applying pressure. Scott et al. disclosed an "electric discharge lamp" (U.S. Pat. 3,258,630) that comprised a serpentine channel with one member press molded and another member left planar. A separate sealing of the processed members was necessary to obtain the lamp.

Tsukada disclosed a flat fluorescent lamp for liquid crystal backlighting in 1993 (U.S. Pat. 5,220,249) which consisted of a molded member and a planar plate that were independently processed. The lamp had parallel serpentine channels. The molded member and the planar plate underwent a separate sealing operation after they were coated and processed. Hicks et al. disclosed a "wafer light" (13th DASC.AIAA/IEEE Digital Avionics System Conference p. 630–635, Oct. 30 –Nov. 3, 1994) for backlighting a liquid crystal display. It consisted of a channel plate with serpentine grooves and a flat plate. These members were sealed after coating and processing to yield a single unit lamp.

Related applications of the present inventors include "Flat Compact Fluorescent Lamp", U.S. patent application Ser. No. 08/291,887 (filed Aug. 17, 1994); "A Method of Manufacturing Substantially Flat Fluorescent Lamp", U.S. patent application Ser. No. 08/452,312 (filed May 26, 1995); "Flat Compact Fluorescent Lamp with Inter-Channel Discharge Suppression", U.S. patent application Ser. No. 08/599,389 (filed Feb. 9, 1996); and "Flat Compact Fluorescent Lamp with Improved Appearance and Increased Efficiency", U.S. patent Ser. No. 08/627,905 (filed Mar. 18, 1996). All of these applications are owned by the same assignee as the present application.

SUMMARY OF THE INVENTION

The integrally molded glass unit has a convoluted channeled section that is obtained by vacuum assisted sag molding of glass. A planar glass section is fused to the walls of the channeled section. While the channeled section is still hot during vacuum assisted sag molding operation, the planar section is sealed to the channel walls by a hot press operation in which the glass of the planar section fuses into the glass of the channel walls. Two tubular sections are formed in the closed unit for sealing two small tubes to which electrodes are sealed, after coating the inner surfaces of the closed unit with phosphor.

Several methods of depositing the phosphor in the lamp are available. In one method, prior to sealing the electrodes, a phosphor slurry is poured into one of the holes while holding the unit slanted. Thus, a column of phosphor is trapped and is moved through the channel by suitably pressurizing nitrogen gas behind the trapped column of phosphor. The slurry is drained through the other hole. Once the phosphor is drained out, the integrally molded glass unit is held horizontal and spun about the central hole while simultaneously injecting nitrogen through the center hole until the phosphor is uniformly dried. In another method the slurry of phosphor is sucked out slowly from the lamp with a liquid suction pump. The technique coats the walls uniformly. In either technique, drying the phosphor layer uniformly can be accomplished by pushing nitrogen gas through the opposite hole. Subsequently, two electron-emissive electrodes are sealed by flame sealing, and the lamp is processed and aged. A reflective coating can be externally applied on the outer surfaces of the channeled portion.

While for many applications we prefer to coat the reflective coating on the exterior of the channelled member, sometimes it is advantageous to apply the reflective coating to the interior of the envelope. In such cases, the reflective coating is placed beneath the phosphor coating by injecting a quantity of a slurry of conventional reflective material into the hole and then allowing it to flow through the channel at a predetermined depth whereafter it can be dried by conventional methods.

In addition to slurry methods, powders of the reflective material and/or the phosphor can be coated using electrostatic techniques, as is conventional in the lamp making industry. With such techniques, an electrostatically-charged powder is driven into the area where the coating is desired using an inert gas such as nitrogen. Acceleration of the adhesion of the particles to the channelled member is provided by disposing an electrically-grounded plate outside the glass surface. Changing the width of the grounded plate can change the area of the coating on the interior surface. For example, a coating of 10° on the inside of the channel can be accomplished by placing a narrow grounded plate adjacent the bottom of the channel while a 180° coating can be accomplished by encircling the outside of the channel as a mask. The electrostatically-charged particles of either dry reflective material or phosphor are blown through one of the openings and removed through the other.

DESCRIPTION OF THE PREFERRED EMBODIMENTS

Figure 1:
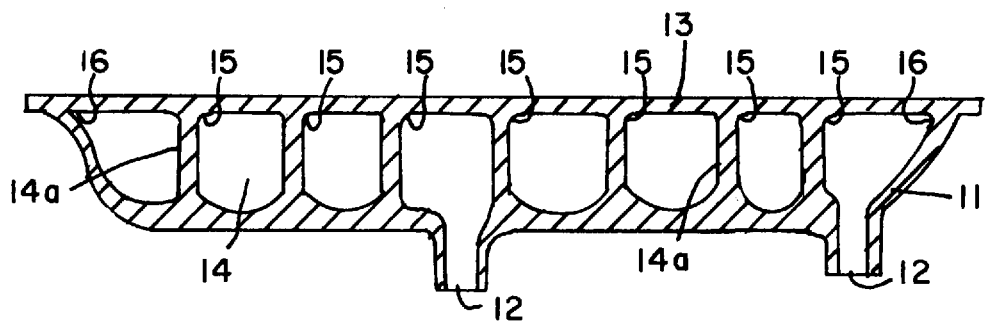
FIG. 1 is a cross-sectional view of an integrally molded convoluted channel compact fluorescent lamp.

FIG. 1 illustrates the cross-section of an integrally molded glass unit with spiral channel part 11, spiral channel 14 and the planar member 13. The channel 14 is formed by the walls 14a. The single molded unit contains integral tubulations 12, 12 formed in part 11 to which the electron-emissive assembly can be flame sealed later. The planar unit 13 is fused at fused sections 15 and 16 of the walls 14a. Such fusing is accomplished by press sealing the channel member 11 while the channel member is still molten during vacuum-assisted sag molding. The sections 15 and 16 are vacuum tight and free from any interchannel discharge leaks when the lamp is made since the glass of the walls 14a is fused to the planar unit 13. Such fusion between parts eliminates the laborious formation of frit seals as was done previously with lamps of the present type. The weight of the unit for 5¼" diameter lamp is 70 grams. Flame sealing the electrodes to the tubulations 12, 12 is a fast operation that is convenient for mass manufacturing.

Figure 2:
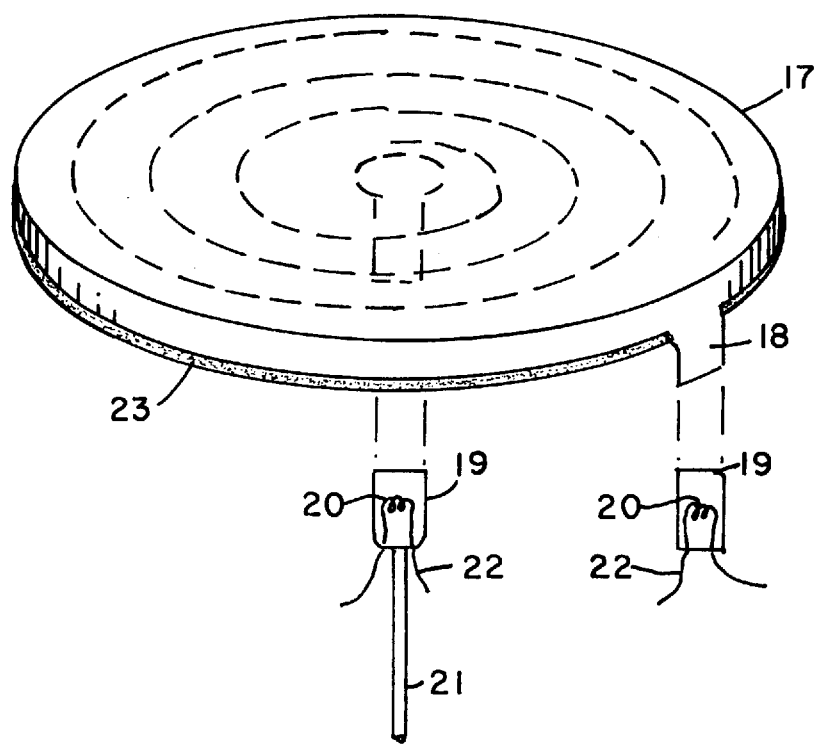
FIG. 2 is an isometric view of the integrally molded unit with the electrodes in line with two small tubes of the integrally molded unit.

FIG. 2 is an isometric view of the integrally molded part 17 with tubulations 18, 18 and an externally-coated reflective layer 23. The inner surfaces of the spiral channel are coated with phosphor, as discussed herein. Two electrode assemblies are used. A central one has an exhaust tubulation 21, leads 22, and electron-emissive electrodes 20 disposed in a glass tube 19. An outer one has all of the components of the central one except the exhaust tubulation. These assemblies are sealed to the tubulations 18, 18 of the integrally molded member 17 in a conventional flame-sealing operation. A completed lamp with a diameter of 5¼" weighs 80 grams.

Figure 3:
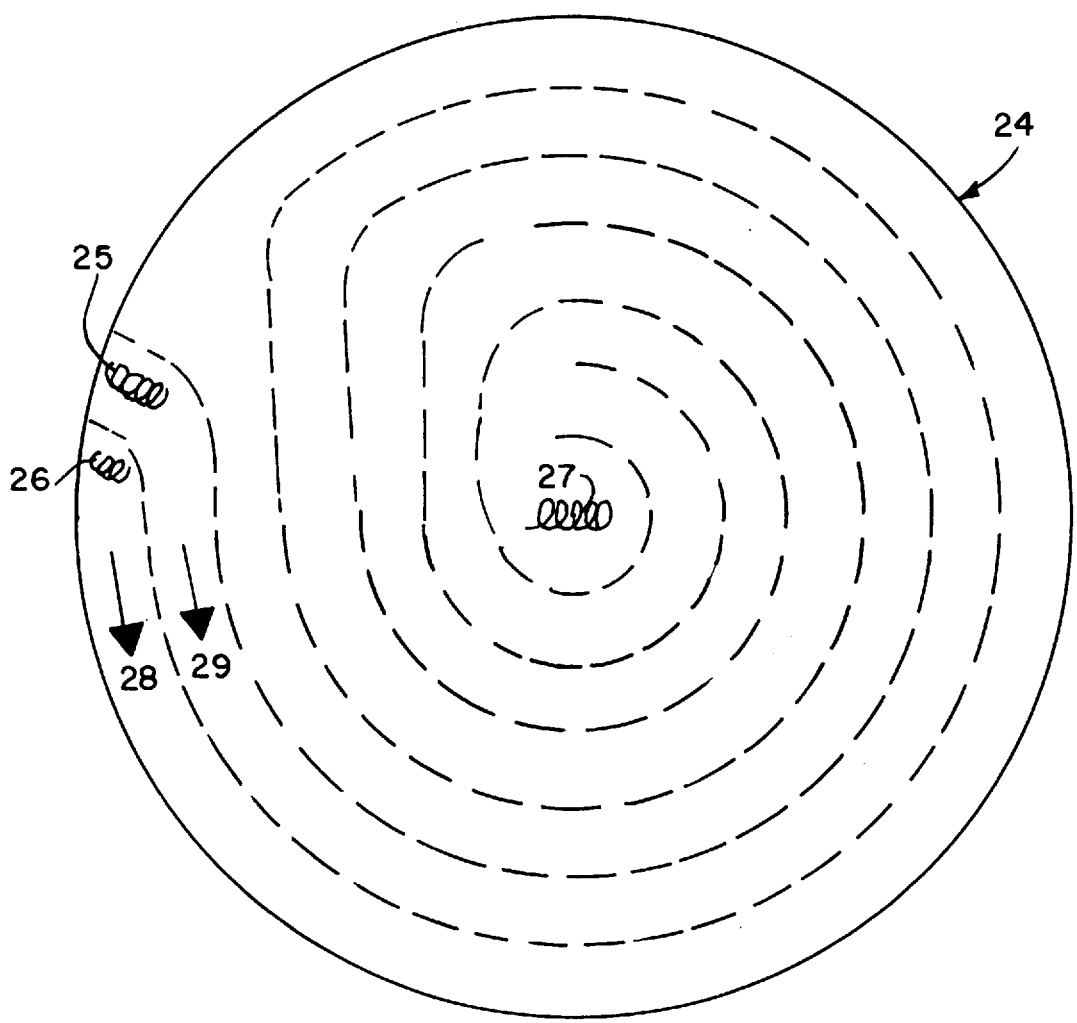
FIG. 3 is the plan view of the integrally molded glass part with a double parallel spiral channel.

FIG. 3 is a another embodiment of an integrally molded unit 24 with double spiral channels 28, 29 running parallel all the way from the outer two electrodes 25, 26 to the center common electrode 27. In situations where the lamp voltage is required to be low, the parallel spiral channels can be employed. In other ways, the lamp is constructed similarly to the lamp of FIG. 2. Coating the phosphor is also accomplished as discussed herein.

Figure 4:
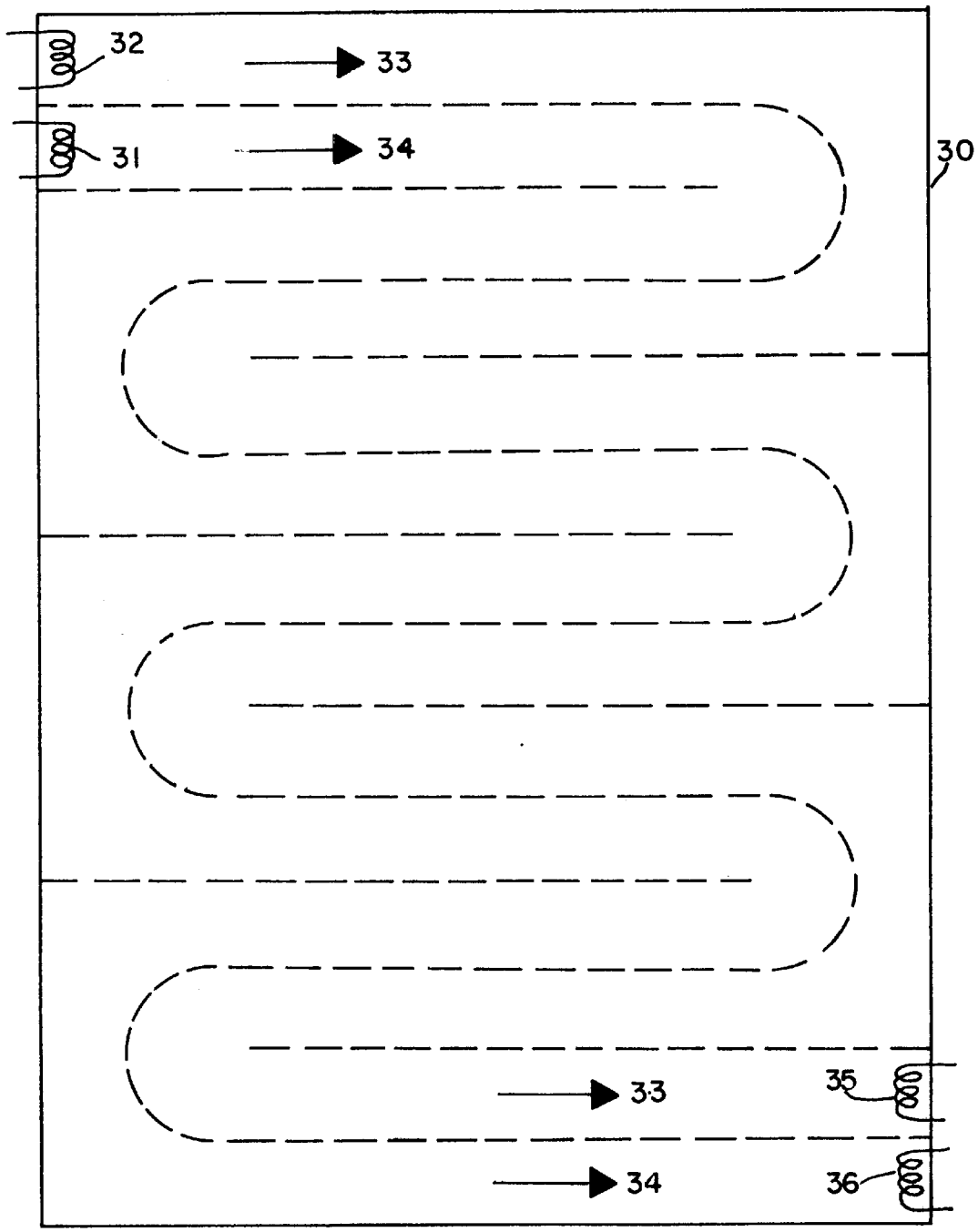
FIG. 4 is another plan view of a double serpentine channel of the integrally molded glass.

FIG. 4 is still another embodiment of the integrally molded unit 30 with two parallel serpentine channels 33, 34 extending from two top electrodes 31, 32 to two bottom electrodes 35, 36. In other ways, the lamp is constructed similarly to the lamp of FIG. 2. Coating the phosphor is also accomplished as discussed herein.

Figure 5:
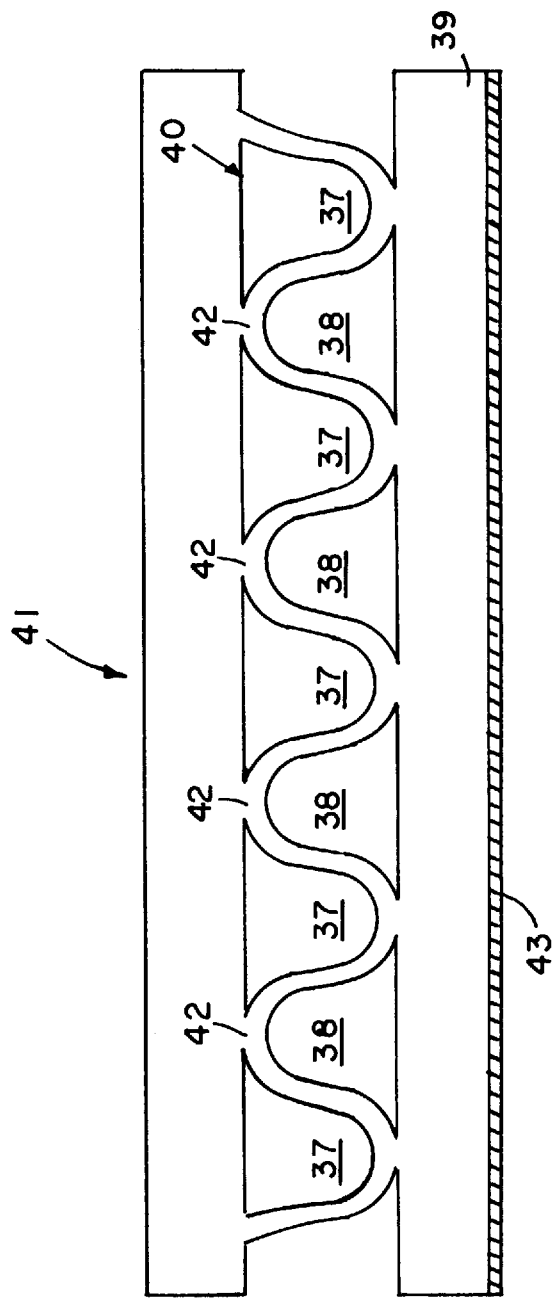
FIG. 5 is the cross-section of a double-sided molded unit.

FIG. 5 is yet another embodiment of the integrally molded unit 41 containing two sets of channels 37 and 38, either serpentine in the case of rectangular or square geometry, or spiral in the case of circular geometry, fused to the planar parts 40 and 39 on opposite sides. Two independent discharges can be run in channels 37 and 38 by appropriately attaching the electrodes and driving them. The inside surfaces of the channel walls of 37 and 38 are coated with phosphor (not shown) and the external surface of planar member 39 is coated with a reflective layer 43. By running a discharge through channels 37, the regions marked 42 will be relatively dark. But if the discharges in the channels 38 are also run simultaneously, the high emission from behind the regions 42 will illuminate the otherwise dark areas 42. Thus, a uniform illumination upward can be obtained in spite of the glass fusion regions 42. Hence, this "double-sided" flat compact fluorescent lamp will be suitable for LCD backlighting. If each channel is coated with phosphors emitting different colors or color temperatures, a variable color lamp can be provided by adjusting the power in each channel.

The invention of the integrally molded lamp is further vividly illustrated through a prototype fabrication that is completed and is described below.

PROTOTYPE ILLUSTRATION

An integrally molded glass unit employing soda lime glass with a diameter of 5¼" comprising spiral channels with a side wall inclination of 16" was cleaned and the inner surfaces of the spiral channels were coated with phosphor employing a unique technique. The coated unit was baked at 450° C. for 30 minutes in air. Two electron-emissive electrodes were sealed to the two holes of the molded member. The sealed unit was processed in a traditional way and aged. A reflective layer was applied on the external surfaces of the channel part of the unit. The electro-optical-mechanical characteristics were as follows:

| | |
|---|---|
| Diameter of the lamp: | 133 mm |
| Width of the channel at the bottom: | 5 mm |
| Inclination of side walls of channel to the vertical: | 16° |
| Total luminous flux without reflective coating: | 1550 lm |
| Total luminous flux with reflective coating: | 1250 lm |
| Lamp power: | 2 0W |
| Lamp voltage: | 199 V |
| Lamp current: | 133 mA |

While it is apparent that changes and modifications can be made within the spirit and scope of the present invention, it is our intention, however, only to be limited by the appended claims. As our invention

We claim:

1. An integrally molded, flat compact fluorescent lamp comprising:
   a vitreous glass convoluted channeled member having glass walls forming the channel;
   a vitreous glass planar member, the glass forming said walls of said channelled member being fused directly with the glass of said planar member to form a hermetic seal, the two members forming an envelope with a closed internal convoluted channel disposed therein the seal between said channeled member and said planar member consisting of the glass of which said members are made;
   at least two spaced-apart electron-emissive electrodes, each of said electrodes being sealed to said channel member;
   a coating of a light-emissive phosphor disposed on the inside of said channel walls.

2. The lamp according to claim 1 wherein the phosphor density is smaller on the planar member than on the channel member.

3. The lamp according to claim 1 wherein said electrodes are a centrally-situated electron-emissive electrode and at least one electrode disposed on the periphery of said lamp.

4. The lamp according to claim 1 further including a light reflective layer disposed on either the inside or the outside surfaces of said planar member.

5. The lamp according to claim 1 wherein the integrally molded channel is parallel-running multi-spiral channels.

6. The lamp according to claim 1 wherein the external shape of the molded member is square, rectangular or elliptical.

7. The lamp according to claim 1 wherein the channels are serpentine or parallel-running multi-serpentine.

8. The lamp according to claim 1 wherein said planar member has a convoluted channel member disposed thereon, the channel member on said planar member being in complimentary registry with the channel on said channel member.

9. The lamp according to claim 1 wherein said channel member is integral with two planar members on both sides of the channel member, the inner walls of the channel member being coated with a light-emissive phosphor layer and the external surface of one of the planar members being coated with a reflective layer, said lamp further including three or four electron-emissive electrodes located to run a discharge independently in upper channels and lower channels formed between planar members and the channel members.

10. The lamp according to claim 1 wherein the lamp has two separate channels and a phosphor layer disposed in each channel, the phosphor layers on the inner surfaces of said channels being of the same color temperature or different color temperatures to provide a constant color temperature lamp or variable color temperature lamp.

11. The lamp according to claim 1 wherein said channels are spiral, serpentine, or parallel spiral or parallel serpentine.

12. The lamp according to claim 1 wherein said channels are disposed in an upper and lower configuration, and related as separately operating independent lamps sharing common walls separating the lamps from each other.

13. An integrally molded, flat compact fluorescent lamp, said lamp having a low weight relative to prior art lamps, said lamp further not employing frit sealing of components whereby to slow manufacturing rate and increase production costs, said lamp comprising:
   a vitreous glass convoluted channeled member having glass walls forming the channel;
   a vitreous glass planar member, the glass forming said walls of said channelled member being fused directly with the glass of said planar member to form a hermetic seal, the two members forming an envelope with a closed internal convoluted channel disposed therein the seal between said channeled member and said planar member consisting of the glass of which said members are made;
   at least two spaced-apart electron-emissive electrodes, each of said electrodes being sealed to said channel member;
   a reflective coating directly adhering to the inside of the channel, said reflective coating covering the channel at subtended angles between about 10° and 270° of said channel;
   a coating of a light-emissive phosphor disposed on the inside of said channel walls and over said reflective coating.

14. The lamp according to claim 13 wherein said electrodes are a centrally-situated electron-emissive electrode and at least one electrode disposed on the periphery of said lamp.

* * * * *